United States Patent [19]

Scibilia

[11] 4,071,294
[45] Jan. 31, 1978

[54] PHOTOGRAPHIC APPARATUS INCLUDING IMPROVED APERTURE PLATE

[75] Inventor: Peter A. Scibilia, Westwood, Mass.

[73] Assignee: Polaroid Corporation, Cambridge, Mass.

[21] Appl. No.: 712,381

[22] Filed: Aug. 6, 1976

Related U.S. Application Data

[63] Continuation of Ser. No. 416,080, Nov. 15, 1973, abandoned.

[51] Int. Cl.² .............................................. G03B 1/48
[52] U.S. Cl. .................................. 352/72; 352/78 R; 352/224; 352/228
[58] Field of Search ................... 352/72, 77, 78, 221, 352/224, 226, 228, 229

[56] References Cited

U.S. PATENT DOCUMENTS

| | | | |
|---|---|---|---|
| 1,888,527 | 11/1932 | Edouart | 352/228 |
| 1,994,586 | 3/1935 | Mihalyi | 352/228 |
| 2,497,847 | 2/1950 | Coutant et al. | 352/221 |
| 2,598,364 | 5/1952 | D'Avitaya | 352/228 |
| 2,789,489 | 4/1957 | Zwakenberg et al. | 352/228 |
| 2,897,719 | 8/1959 | Tiller | 353/228 |
| 2,981,146 | 4/1961 | Kipping | 352/228 |
| 2,996,951 | 8/1961 | Debrie | 352/228 |
| 3,233,959 | 2/1966 | Gasser | 352/77 |
| 3,395,965 | 8/1968 | Teshi et al. | 352/221 |
| 3,781,101 | 12/1973 | Kaneko et al. | 352/221 |

FOREIGN PATENT DOCUMENTS

| | | | |
|---|---|---|---|
| 962,614 | 6/1950 | France | 352/228 |

Primary Examiner—Stephen J. Tomsky
Assistant Examiner—Alan Mathews
Attorney, Agent, or Firm—Frederick J. Goettel, Jr.

[57] ABSTRACT

Photographic apparatus including an aperture plate adapted to cooperate with a pressure plate of a film handling cassette so as to laterally bow an incremental section of photographic film retained within the cassette into a precise location without contacting the usable portion of the emulsion. Additionally, the aperture plate is longitudinally channeled and includes a ramp extending along a portion of one side of the aperture plate channel so as to urge the film strip to its proper location as the film strip is translated traversely of the aperture plate during insertion of the cassette in the apparatus.

22 Claims, 4 Drawing Figures

PHOTOGRAPHIC APPARATUS INCLUDING IMPROVED APERTURE PLATE

This is a continuation of application Ser. No. 416,080, filed Nov. 15, 1973, now abandoned.

BACKGROUND OF THE INVENTION

1. Field of the Invention

This invention relates to photographic apparatus and, more particularly, to improved motion-picture apparatus.

2. Description of the Prior Art

Recent important technological advances have made it possible to provide multipurpose motion-picture cassettes from which the film need not be removed during exposure, processing and projection operations. Exemplary of such new and unique systems are those described in prior U.S. Pat. No. 3,615,127 of Edwin H. Land issued Oct. 26, 1971; U.S. Pat. No. 3,537,784 of Rogers B. Downey issued Nov. 3, 1970; U.S. Pat. No. 3,608,455 of Rogers B. Downey issued Sept. 28, 1971; and U.S. Pat. No. 3,627,407 issued Dec. 14, 1971 of Gerald H. Cook.

In these systems, the cassette is first operated in a camera for exposure of the film strip and then subsequently loaded into a projector apparatus which first subjects the cassette to a sequence of operations including treating the film with a processing fluid so as to process the film strip to a viewable condition and then subsequently projects the developed, recorded images. During these processing operations, the film strip is advanced across both a processing station and an exposure-projection station of the cassette. Provision is made in the exposure-processing station to minimize contact with both the film emulsion layer and the fluid layer deposited thereon. This is accomplished by providing a longitudinal channel in the cassette pressure plate such that the latter only contacts the film margins of the emulsion side of the film strip.

To further minimize retarding forces on the film, particularly desirable in battery operated apparatus, the aperture plate of the camera is also preferably channeled such that when the cassette is operatively positioned in the camera, the film margins are loosely confined between juxtaposed portions of the aperture plate and the pressure plate.

In such an arrangement, while the margins of the film are adequately supported over the exposure aperture, some variation may occur in the location of the centrally located image recording area of the film strip, and it is desirable to provide an arrangement for positioning the image area of the film in a precise location while still minimizing drag forces on the film and contact with the emulsion surface.

Further, in the camera of the preferred embodiment, cassette insertion requires that the film be translated laterally across the aperture plate as the cassette is seated in its operative location. With a longitudinally channeled aperture plate, complications arise due to the irregularity in the plate surface which can intercept the edge of the film during this operation, and thereby preclude proper seating of the film.

Consequently, it is a primary object of this invention to provide improved apparatus for accomplishing photographic operations.

It is another primary object of this invention to provide photographic apparatus configured to receive a film handling cassette and to facilitate positioning of its film strip in a precise focal location.

Still another object of this invention is to provide an improved motion-picture system which efficiently positions the photographic film in a suitable focal location.

SUMMARY OF THE INVENTION

The photographic system of the present invention includes means for loosely confining the margins of a film strip so as to position the centrally located portion thereof over an exposure or projection aperture and for bowing the film so as to locate the centrally located portion in a precise location without contact to the emulsion in the image recording area.

In the illustrated embodiment, the film strip is permanently retained within a film handling cassette which includes a pressure plate designed to support the film margins as the latter passes an exposure opening in the cassette wall. The camera structure carries a longitudinally channeled aperture plate designed to cooperate with the cassette pressure plate such that the film margins are loosely retained between both plates. Additionally, extending transversely across the aperture plate are a pair of curved pads which extend slightly above the reference surface of the aperture plate so as to bow the film outwardly of the plate and into a precise film plane. The camera of the illustrated embodiment includes a cassette-receiving pocket or recess which requires insertion of the leading edge of the cassette into the pocket and consequent rotation of the cassette into a proper position therein. This arrangement causes a translation laterally of the cassette film across the aperture plate of the camera. Consequently, to facilitate proper seating of the film strip and the cassette pressure plate, the aperture plate of the camera includes ramp portions which extend from the base of the plate channel to one of its raised edges thereof to urge the film out of the channel and to its proper position as the film strip is translated across the aperture plate during cassette insertion.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

The illustrated embodiment of this invention employs a multipurpose film handling cassette of the type described in the commonly assigned copending patent application Ser. No. 227,092 of John F. Batter, Jr. et al, filed Feb. 17, 1972. Such a cassette is configured for use in a motion-picture system in which the several operations of exposure, chemical processing, drying and projection of the recorded images are accomplished without transferring the film from the cassette.

In the above system the film strip stored within the cassette is first exposed in a camera to record scene images thereon. Then the cassette is loaded into a special purpose projector which first subjects the film strip to a processing treatment and thereafter dries the film strip and projects the recorded images for viewing by an audience.

Figure 1:
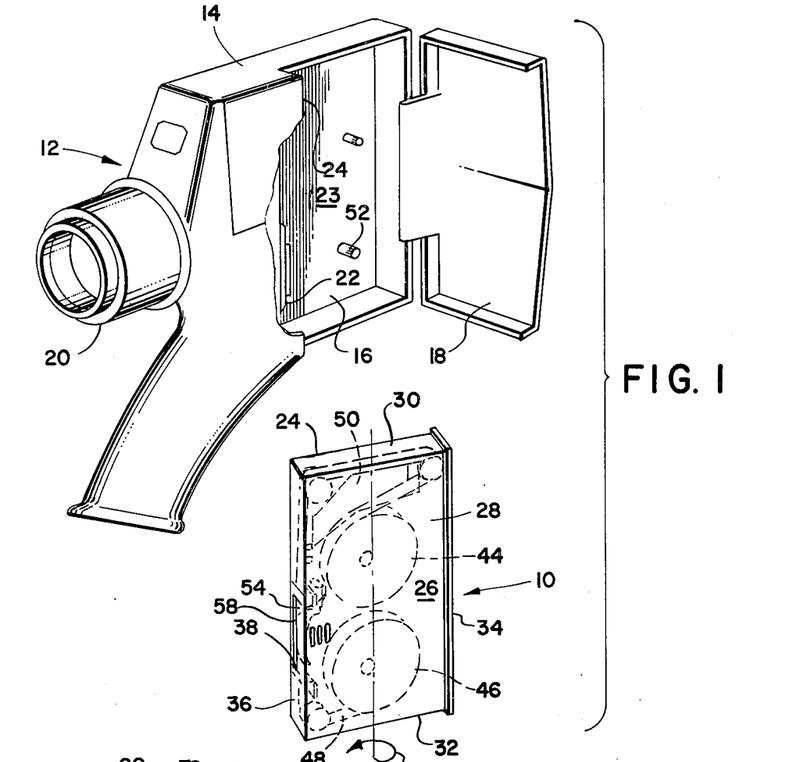
FIG. 1 is a diagrammatic view in perspective of a camera and a film handling cassette embodying the features of this invention.

In the illustrated embodiment of the invention, which may be best understood by first referring to FIG. 1 of the drawing, wherein a multipurpose film handling cassette 10 of the above-noted type is shown in conjunction with a camera 12. Referring first to the camera, it can be seen from FIG. 1 that the camera 12 includes body 14 having a cassette-receiving pocket 16 which is closed by a door member 18. Positioned within the leading edge of the pocket 16 in registration with a conventional taking lens assembly 20 is an aperture plate 22. As later explained in detail with regards to positioning of the cassette 10 within the camera body 14, the aperture plate 22 is positioned within a confined recess portion 23 of the cassette-receiving pocket 16 which is formed in part by an overlying edge portion 24 of the camera body 14.

Prior to completing the description of the camera, the cassette 10 will be more fully described. In this embodiment, the cassette 10 comprises a generally parallelepiped casing or housing 26 constituted by a pair of planar side walls 24 and 28 joined together at their edges by end walls 30, 32 and elongated edge walls 34 and 36. Carried within the edge wall 36 is an opening 38 which permits access of image carrying light rays to the cassette for exposure of the film and egress of image carrying light rays from the film for image projection as later explained in detail.

Internal components of the cassette 10, which are shown in FIG. 1 in dotted lines, include a supply spool or reel 44 and a take-up spool or reel 46 coplanarly mounted for rotation about parallel axes. A photographic film strip 48, of the type described in the aforementioned applications, is mounted within the camera 12 with its opposite ends respectively connected to the film spools 44 and 46 such that in accordance with rotation of the latter, the film strip 48 may be progressively advanced within the cassette casing 28. Initially, the film strip 48 is, in its unexposed state, coiled primarily about the supply spool 44, and in its path from the supply spool 44 to the take-up spool 46, the film strip 38 passes through a processing station 50 and across the cassette opening 38.

Figure 2:
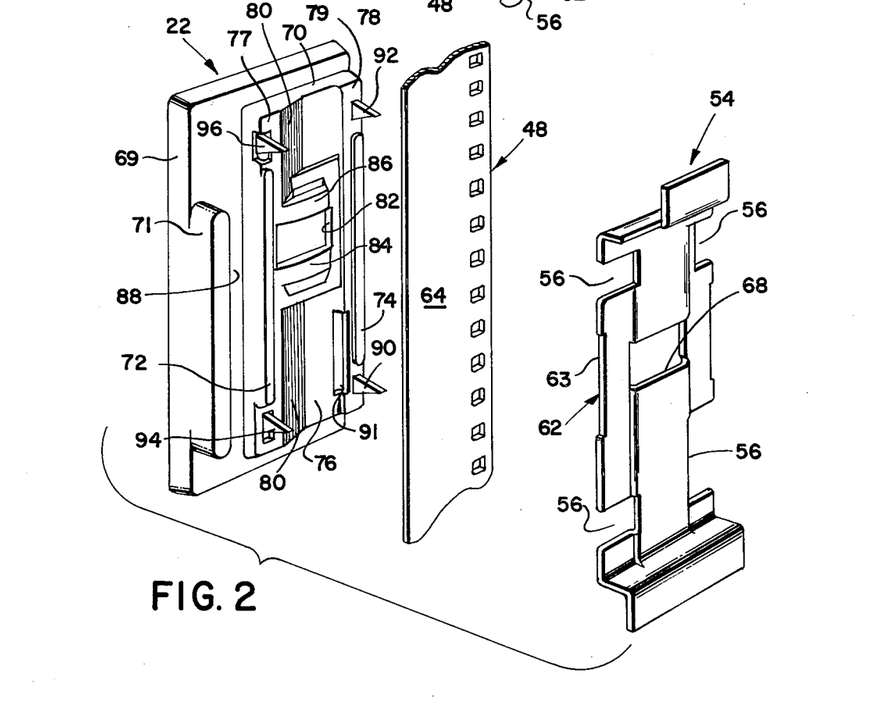
FIG. 2 is an exploded view in perspective illustrating the juxtaposed position of the camera aperture plate and the film and pressure plate of the cassette shown in FIG. 1 when the cassette is located in an operative location in the camera.

The film strip 48 extends within the cassette 10 from spool 44 to spool 46 such that the emulsion side of the film is positioned inwardly, or that is, toward the pressure plate 54. To prevent contact with the emulsion (not shown) and provide clearance for the later deposited processing fluid (also not shown), the pressure plate 54 includes a film reference surface 62 as shown in FIG. 2 which contacts only the film margins. This is carried out by a longitudinal channel 60, shown more clearly in FIGS. 3 and 4, which extend throughout the length of the plate 54, and, hence, separates the reference surface 62 into two spaced apart film margin support members 63 and 64.

Completing the description of the pressure plate 54, it should be noted that an aperture 68, which extends through the plate, provides an opening for transmitting projection illumination through the plate and the overlying film during projection operations as later explained in detail. A plurality of openings or side cutouts 56 are provided (as later explained with regard to FIG. 2) to accept the film side guides and the claw (not shown) when the cassette is mounted in the camera. The plate 54 is held within the cassette, by portions (not shown) of the latter which cooperate with offsets 55 at each end of the plate. Lateral movement of the plate 54 is limited by the cassette walls 24 and 26, and a spring member (not shown) of the cassette 10 urges the plate towards the opening 38 so as to provide proper contact between the pressure plate and the aperture plate 22, when the cassette is mounted in the camera.

As previously indicated, the cassette opening 38 is utilized to permit image bearing light rays to impinge upon progressive incremental sections of the film strip 48 when the cassette 10 is operated in the camera 12. In this regard, the camera 12 includes a claw member (not shown) for stepwise advance of the film strip 48, and a spool drive member 52 is configured to cooperate with the take-up spool 46, to rotate the latter, so as to take up the film strip 48 as the incremental sections of the strip are progressively advanced across the cassette opening 38.

Following the exposure operations, the cassette is designed to be operated by other apparatus, not shown, to again advance the film strip, for example, from the take-up spool 46 back to the supply spool 44, while processing fluid, not shown, is deposited on the film by means of the processor station 50. Subsequently, the film is again advanced to the take-up spool 46 while light rays from an external source are directed through incremental sections of the film strip so as to provide viewable images. To facilitate these functions, the pressure plate 54 and a prismatic reflector element (not shown) are mounted behind the opening 38. Further, for projection purposes, another opening (not shown) is provided in the side 24 of the cassette for permitting entrance of light to the prism for transmission through the film strip 48. Hence, the opening 38 first operates as part of an exposure station and then as part of a projection station of the cassette 10.

As previously indicated, in this embodiment the cassette 10 is inserted within the cassette-receiving pocket 16 by placing the cassette edge wall 36 under the overhanging lip 24 of the pocket 16 and then rotating the cassette as shown by the arrow 66 while the cassette is slid forward towards the lens system 20 to bring the exposure opening 38 into cooperative relationship with the camera aperture plate 22. This seats the portion 58 (shown in FIG. 3) of the film 48 which is presented within the cassette opening 38 in proper relation to the aperture plate 22 as later explained in detail with regard to FIGS. 2 and 3.

As can be seen in FIG. 2, the aperture plate 22 includes a base portion 69 from which a film engaging portion 70 and a cassette guide portion 71 extend. In similar manner, to the pressure plate, the film engaging portion 70 provides a film reference surface 78 through which a longitudinal channel or elongated recess 76 is formed. Hence, the surface 78 is, in effect, cut to provide laterally spaced film support surfaces designated 77 and 79 which can contact the film margins. Rising from the support surface 78 are a pair of spacer members or lands 72 and 74 which are designed to bracket the film strip 48 and engage pressure plate 54. More particularly, the spacer members 72 and 74 engage the laterally spaced surfaces 63 and 64 of the pressure plate 54 so as to thereby provide a controlled gap or slot indicated at 81 in FIG. 3 for the margins of the film during camera operations.

Hence, the spacer members 72 and 74 extend above the film reference surface 78 of plate 22 to a height slightly exceeding the overall thickness of the film strip 48 so as to provide a gap 81 (see FIG. 3) adjoining the film margins which loosely confines, or, that is, provides a loose fit for the film margins and thereby limits movement of the margins perpendicularly toward or away from the plates 22 and 54. Hence, the film reference surfaces 78 and 62 of both plates 22 and 54 together provide means for loosely retaining the film margins in a predetermined plane parallel to the camera or aperture plate reference surface 78.

Figure 3:
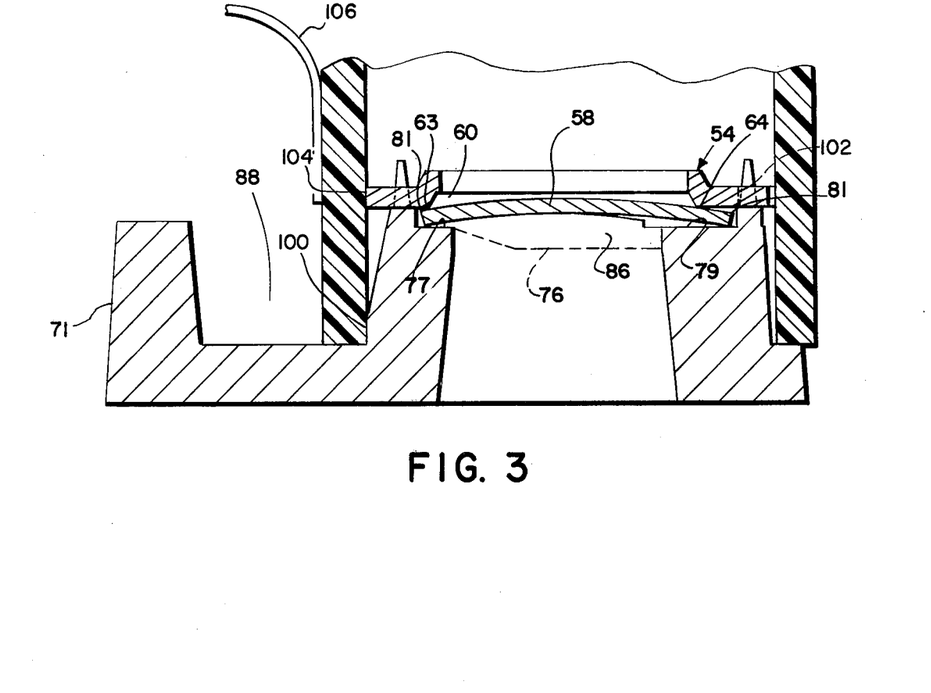
FIG. 3 is a view in section taken through the center of the aperture plate and illustrating the operating conditions of the latter when the cassette of FIG. 1 is operatively located within the camera of FIG. 1.
Figure 4:
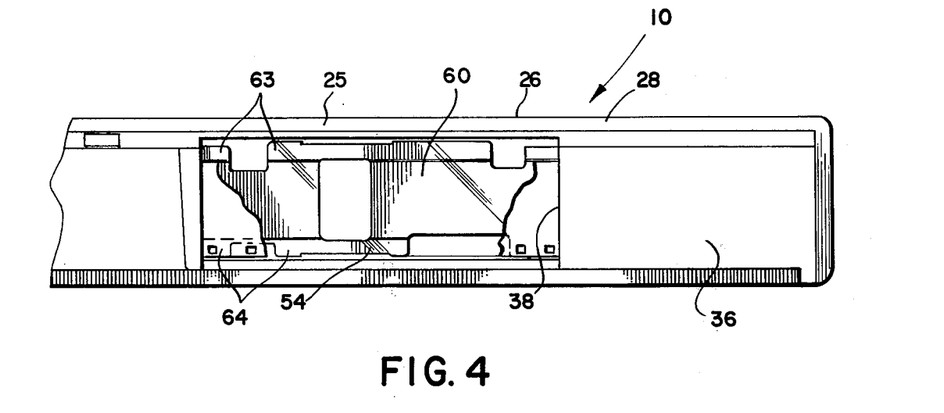
FIG. 4 is a plan view of the cassette edge wall with the film strip cut away so as to further illustrate the cassette and the pressure plate.

Continuing with the description of the aperture plate 22, it can be seen that carried within the aperture plate is an aperture 82 which is intended to frame the image carrying rays transmitted rearwardly through the camera lens system 20. Positioned respectively at the trailing and leading edges of this aperture 82 are a pair of film support pads 84 and 86. These pads 84 and 86 extend above the surface 78 to contact the film and, as later explained in detail with respect to FIG. 3, are convexly shaped transverse to the longitudinal axis of the plate 22 so as to laterally bow the film into a precise location (or so-called "curved focal plane") without contact to the centrally located image recording area of the film emulsion. Hence, the pads 84 and 86 cooperate with the surfaces 63 and 64 of the plate 54 to force the film towards the channel 60.

An opening 91 is provided in the reference surface 78 to permit operation of a claw (not shown). Fixedly positioned along one side of the aperture plate 22 are a pair of side guides 90 and 92 which cooperate with a pair of movable side guides 94 and 96 of the camera 12 to laterally position the film strip and the pressure plate 24. It should be noted that the side guides 94 and 96 extend through the aperture plate 22 and are spring biased by means (not shown) towards the fixed side guides 90 and 92. A ramp 80 whose operation is explained in detail below, extends from pads 84 and 86 to each end of the plate 22 along one side of the channel 76 so as to provide an inclined cam surface extending from the base of the channel to surface 78.

As previously indicated, the cassette is seated in operative relation with the aperture plate 22 by rotating the cassette as it is received in the camera 12. In this arrangement, the edge portion 25 (see FIG. 4) of the cassette wall 24 where the latter adjoins the opening 38, enters a cassette aligning channel 88 formed between the raised portions 70 and 71 of the aperture plate. Thereafter to complete the insertion of the cassette, the cassette opening 38 is pivoted onto the aperture plate so that its film portion 58, which is presented at that time within the opening 38, is translated laterally (from left to right in FIG. 2) into overlying engagement with the aperture plate.

As the cassette 10 is inserted within the camera 12 and the exposed portion 58 of the film strip 48 is translated laterally across the aperture plate 22, the film edge is prevented from catching on the edges of the aperture plate channel 76 by the ramp 80. In this arrangement, the ramp operates to cam the leading margin or edge of the film strip (as viewed with respect to the aforementioned translation) upwardly to a proper location on the reference surface 78.

Referring now to FIG. 3 wherein the area of the cassette opening 38 and the aperture plate 22 is shown in section (taken transversely through the plate apertures) it can be seen that the pads 84 and 86, in cooperation with the controlled gaps 81 formed around each of the film margins, forces the film into a bowed or curved focal plane. Advantageously, this provides a precise film location without contact to the usable portions of the emulsion. That is, the curvature of the raised pads in conjunction with the lower location of the narrow gaps 81 force the film into the curve focal plane. Stated otherwise, as the cassette 10 is seated in proper position on the aperture plate 22, the forwardmost portions of the pressure plate 52, namely the laterally spaced surfaces 63 and 64, which are in engagement with the margins of the film strip, force the margins downwardly over the pads 84 and 86, and into contact with the reference surface 78 of the aperture plate 22. This, in turn, curves the film in a direction away from the lens system 20 and precisely positions the film within a proper focal location. Advantageously, the camera lens system is designed in a conventional manner to provide a curved focal plane. It should be noted that the curved pads 84 and 86 do not force the medial portion of the film 48 into contact with the pressure plate 54 (the bottom of the channel 60) since the stiffness of the film strip in cooperation with the narrow gap 81 at the margins tends to hold the film center close to the pads 84 and 86, and thereby provides a repetitive position of the film at the focal plane. Hence, it should be understood that the raised, curved pad surfaces 84 and 86 in cooperation with the margin contacting surfaces provide means for positioning the film in a proper focal location while precluding contact to the medial portion of the emulsion surface. Further, it should be noted that since the film margins are not clamped, they provide essentially line contact with the juxtaposed surfaces 63, 64, 77 and 79. Consequently, retarding forces on the film are also minimized.

In the preferred embodiment, the film strip 48 includes rail members (not shown) extending along both margins of the non-emulsion side of the film strip as described and claimed in the commonly assigned U.S. pat. application Ser. No. 214,918 of Edwin H. Land, filed Jan. 3, 1972. Hence, the film margins are thicker than the remainder of the strip of film, however, the control gap 81 for margins (provided essentially by the spacers 72 and 74 of the aperture plate 22) are designed to accommodate the added thickness and, in effect, slightly exceed the overall thickness of the margins including the rails.

In an exemplary embodiment where the film base plus the emulsion was approximately 0.0035 inch thick and the rails approximately 0.0015 inch thick to thereby provide a film margin thickness of about 0.005 inch, the spacer lands 72 and 74 were extended 0.006 inch above the reference surface 78 so as to provide a control gap of 0.006 inch for 0.005 inch thick edges of the film. The curved pads 84 and 86, which are cylindrical at their upper surface, were extended at their center approximately 0.007 inch above the aperture plate reference surface (approximately 0.001 inch below the top of the spacers 72 and 74 such that when the 0.0035 inch thickness of the film is considered, the center portion thereof is bowed approximately 0.001 inch to 0.002 inch into an approximately 0.008 inch deep pressure plate channel).

To facilitate seating of both the film portion 58 and the pressure plate 54 on the aperture plate 22, the pressure plate 54 is recessed or notched at its edges and the side guides 90, 92, 94 and 96 extend significantly above the surface 70 and employ a shallow cam angle of, for example, 15° on their inwardly positioned sides so as to efficiently contact and guide the film and the pressure plate to its final location as the cassette is seated in the apparatus. Advantageously, this seating is accomplished without danger of the pressure plate hanging up on the guides by employing the recesses or indent-like openings 56 in the pressure plate 54 rather than full apertures whose outer boundaries could strike the outer ends of the elongated guides and thereby interfere with the movement of the pressure plate to its seated position.

To accomplish this positive seating, the lateral location of the seated pressure plate 54 with respect to the aperture plate 22 is controlled by the cassette wall 26 in conjunction with the fixed side guides 90 and 92. The latter guides 90 and 92 engage the inner edges 102 of the right side notches 56 as viewed in the FIGS. 2 and 3, while the cassette wall 26 tends to engage the opposite edge 104 of the pressure plate. In turn, the cassette itself, or at least the wall 26, is referenced to the aperture plate 22 by means of a reference surface 100 located along one edge of the raised film engaging portion 70 as shown in FIG. 3. The cassette is urged into engagement with this surface 100 by means of one or more springs 106 (shown in FIG. 3) which are located beneath the overhanging lip 24 of the camera 12. Hence, it should be understood that, in contrast to devices where the side guides alone, in cooperation with enclosed apertures of a pressure plate, laterally position the pressure plate, the reference surface 100 in the illustrated embodiment locates the cassette wall 26 which, in turn, locates one lateral edge of the pressure plate or, that is, limits the lateral movement of the pressure plate 54 in one direction while the guides 90 and 92 locate the other lateral edge of the pressure plate and thereby limit the plate movement in the other direction.

Those familiar with the motion-picture arts will readily appreciate the novel and highly unique advantages of this photographic system which facilitates seating of the film strip in a precise focal location without contacting the usable emulsion and while providing clearance to the latter for subsequent processing operations. The novel structure provides precise support of the film in the focal plane at the exposure aperture while minimizing film drag which is particularly important in battery operated devices such as hand held cameras. Further, a cassette having a novel pressure plate designed to cooperate with the aperture plate of the apparatus so as to efficiently seat the pressure plate and the film is disclosed.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A photographic system comprising:
a cassette comprising a cassette housing for retaining a strip of photographic film material, said cassette housing including an opening in an edge wall thereof configured to present at least an incremental section of such film strip for cooperation with other apparatus for providing a photographic program with such film strip, and an apparatus comprising an aperture plate configured to engage at least a portion of such presented incremental section of such film strip and support such portion of such incremental section in a predetermined focal position when such cassette is operatively positioned within said apparatus, means for receiving said cassette with such presented incremental section of such film operatively located on said aperture plate, said receiving means being configured for translation of such presented incremental section laterally across said aperture plate as said cassette is operatively located in said receiving means, said aperture plate including a longitudinal channel laterally bounded by spaced film margin engaging surfaces for supporting the margins of such film strip when such film strip is operatively located on said aperture plate, and said aperture plate including a ramp-like portion extending substantially from the bottom of said channel to one of said margin engaging surfaces so as to urge said film out of said channel and to said one margin engaging surface when such film strip is translated laterally across said aperture plate towards said one margin engaging surface during the operation location of such film on said aperture plate, and means for cooperating with such incremental section of such film strip so as to provide such photographic program therewith when such incremental section is located in said predetermined focal position.

2. Photographic apparatus for use with a photographic film handling cassette having a housing configured for retaining a strip of photographic film and an opening in an edge wall of such cassette housing configured to present an incremental section of such film strip for cooperation with means of said apparatus for providing a photographic program with such film strip, said apparatus comprising an apparatus housing, means for receiving such film cassette in an operative location in said apparatus housing and for supporting such incremental section in a predetermined focal position, said supporting means including an aperture plate configured to engage at least a portion of such presented section of such film strip so as to support such incremental portion in such predetermined focal position when such cassette is operatively positioned within said receiving means, said receiving means being configured for translation of such presented incremental section laterally across said aperture plate as such cassette is operatively located in said receiving means, said aperture plate including a longitudinal channel laterally bounded by spaced film margin engaging surfaces for supporting the margins of such film strip when such film strip is operatively located on said aperture plate, and said aperture plate including a ramp-like portion extending substantially from within said channel to at least close to one of said margin engaging surfaces so as to urge such incremental section out of said channel and to said one margin engaging surface when such incremental section of such film strip is translated laterally across said aperture plate towards said one margin engaging surfaces during the operative location of such film on said aperture plate.

3. The apparatus of claim 2 wherein said ramp extends along a substantially length of said channel and provides an inclined surface extending from substantially the bottom of said channel to said one margin engaging surface.

4. The apparatus of claim 2 wherein said ramp extends upwardly from a bottom central portion of said channel to the edge of said one margin engaging surface which defines one edge of said channel.

5. A photographic system comprising:
a cassette comprising a cassette housing for retaining a strip of photographic film material, an opening in an edge wall of said cassette housing configured to present a length of such film strip for cooperation with other apparatus for providing a photographic program with an incremental section of such presented length, and a pressure plate member located in said cassette housing behind such presented length, said pressure plate including a longitudinal pressure plate channel formed by a pair of laterally spaced members, said spaced members configured for engaging and supporting only the margins of one side of such film strip;
an apparatus comprising an apparatus housing, an aperture plate, means for receiving said film cassette in an operative location in said apparatus housing when said cassette is inserted in said receiving means such that such presented length of such film strip is translated laterally across said aperture plate and to a seated position thereon, said aperture plate including means for contacting a portion of the opposite side of such presented length of such film strip intermediate the margins thereof so as to urge such intermediate portion towards said pressure plate and into a predetermined focal position partially within said pressure plate channel and between said spaced members of said pressure plate, said apparatus including means for cooperating with such incremental section of such film strip so as to provide such photographic program therewith when such incremental section is located in said predetermined focal position, said aperture plate including a longitudinal aperture plate channel laterally bounded by spaced apart film margin engaging surfaces configured for supporting the margins of such film strip when such film strip is operatively located on said aperture plate, and said apparatus further including a ramplike portion extending substantially from the bottom of said aperture plate channel to one of said film margin engaging surfaces so as to urge said film out of said aperture plate channel and to said one margin engaging surface when such film strip is translated laterally across said aperture plate towards said one margin engaging surface during the operative location of said cassette within said receiving means.

6. Photographic apparatus for use with a photographic film cassette for providing a photographic operation with progressive incremental sections of a cassette retained photographic film strip, the cassette including a housing configured for retaining the film strip, the film strip including on one side thereof an emulsion layer configured for providing recorded images in a usable portion intermediate the film margins, the cassette housing having an opening in an edge wall thereof configured for presenting a length of the film strip for the photographic operation, means for guiding the film strip across the cassette housing opening with said one side of the film strip facing inwardly of the cassette housing, the guiding means including a pressure plate located within the cassette housing and configured for supporting the margins of the presented length of the film strip at the housing opening, the pressure plate including an elongated channel substantially aligned with the longitudinal axis of the presented length of the film strip, the channel being laterally bounded by a pair of laterally spaced, longitudinally extended members, each member respectively having a film margin engaging surface configured for providing contact solely with the margins of the one side of the film strip, said apparatus comprising:
an apparatus housing;
means for receiving the film cassette in an operative location in said apparatus housing;
means configured for cooperating with the cassette pressure plate when the cassette is operatively positioned in said receiving means so as to urge the portion intermediate the margins of the presented length of the film strip towards the pressure plate and partially into the channel thereof so as to laterally bow the film strip into a precise curved focal location without contact to the usable portion of the emulsion layer, said cooperating means including an elongated aperture plate having an aperture therein configured for passing light rays to or from an incremental section of the film strip, said aperture plate including means for defining a substantially flat film margin reference plane configured to engage at least the margins of the film strip and at least one pad located along the longitudinal axis of said aperture plate and extending out of said reference plane towards the pressure plate so as to engage and urge the intermediate portion of the presented length of the film strip slightly above the reference plane and into the pressure plate channel, and said apparatus includes means for spacing the pressure plate and aperture plate such that said margin engaging surfaces of the pressure plate members are spaced from said aperture plate reference plane a distance slightly exceeding the thickness of the film strip margins so as to define a gap therebetween for loosely confining the film margins while preventing extension of the bow of the film to the bottom of the pressure plate channel.

7. The apparatus of claim 6 wherein said margin engaging surfaces of the pressure plate are substantially coplanar, the pressure plate channel is of given depth, and said pad extends out of said reference plane to a height substantially less than the given depth of the pressure plate channel.

8. The apparatus of claim 6 wherein aperture plate includes a pair of said pads with one pad located at each of the longitudinal ends of said aperture.

9. The apparatus of claim 6 wherein said spacing means comprises at least one spacer member mounted on said aperture plate and configured for spacing the pressure plate therefrom, said spacer member being extended out of said aperture plate film margin reference plane toward the pressure plate a distance configured for spacing the pressure plate margin engaging surfaces from said aperture plate reference plane a distance slightly exceeding the thickness of said film strip margins.

10. The apparatus of claim 6 wherein said aperture plate includes an elongated channel aligned with the film axis and laterally bounded by a pair of laterally spaced, longitudinal extended members having film margin engaging surfaces defining said film margin reference plane.

11. The apparatus of claim 6 wherein said aperture plate includes an elongated base plate having on one surface thereof a pair of raised members whose uppermost surfaces are substantially coplanar and define said film margin reference plane, said raised members extending along said base plate substantially parallel to the longitudinal axis thereof and defining a longitudinal channel therein whose bottom surface is defined by said one surface of said base plate, said raised members being spaced apart a distance substantially approximately equal to or slightly greater than the width of the usable intermediate portion of the film strip, at least one spacer member extending from said one surface to a height exceeding that of said raised members and configured to contact the pressure plate and define said gap for the film margins, said spacer member being spaced laterally of the longitudinal axis of said base plate and to one side of said aperture plate channel and one of said raised members, an aperture located between said raised members, and a pair of pads of relatively short longitudinal length located between said raised members in said channel, each of said pads extending from said one surface of said base plate to a height exceeding that of said raised members so as to engage the intermediate portion of the film strip and urge the intermediate portion into the pressure plate channel.

12. The apparatus of claim 6 wherein said at least one pad is of relatively short longitudinal length as compared to the length of said raised members, and the film engaging surface of said pad is convexly shaped in a plane transverse to the longitudinal axis of said aperture plate.

13. The apparatus of claim 6 wherein said pad extends out of said reference plane to a height configured to bow the emulsion layer of the film strip 0.001 inch into the pressure plate channel, and said gap for confining the film margins being configured for limiting the bow of the film strip into the pressure plate channel to approximately 0.002 inch.

14. A photographic system comprising:
a photographic film cassette comprising:
a cassette housing having an opening in an edge wall thereof;
a photographic film strip retained within said cassette housing, said film strip including on one side thereof an emulsion layer configured for providing recorded images in a usable portion intermediate the film margins;
means for guiding the film strip across said cassette housing opening with said one side of the film strip facing inwardly of said cassette housing so as to present a length of said film strip for cooperation with photographic apparatus for providing a photographic operation with an incremental section said said presented length of said film strip, said guiding means including a pressure plate located within said cassette housing and configured for supporting the margins of said presented length of said film strip at said housing opening, said pressure plate including an elongated channel substantially aligned with the longitudinal axis of said presented length of said film strip, said channel being laterally bounded by a pair of laterally spaced, longitudinally extended members, each member respectively having a film margin engaging surface configured for providing contact solely with the margins of said one side of said film strip;
said apparatus comprising:
an apparatus housing;
means for receiving the film cassette in an operative location in said apparatus housing;
means configured for cooperating with said pressure plate when said cassette is operatively positioned in said receiving means so as to urge a portion intermediate the margins of the presented length of the film strip towards said pressure plate and partially into the channel thereof so as to laterally bow said film strip into a precise curved focal location without contact to the usable portion of the emulsion layer, said cooperating means including an elongated aperture plate having an aperture therein configured for passing light rays to or from an incremental section of said film strip, said aperture plate including means for defining a substantially flat film margin reference plane configured to engage at least the margins of said film strip, at least one pad located along the longitudinal axis of said aperture plate and extending out of said reference plane towards said pressure plate so as to engage and urge the intermediate portion of said presented length of said film strip slightly above the reference plane and into said pressure plate channel, and means for spacing said pressure plate and aperture plate such that said margin engaging surfaces of said pressure plate members are spaced from said aperture plate reference plane a distance slightly exceeding the thickness of said film strip margins so as to define a gap therebetween for loosely confining said film margins while preventing extension of the bow of said film strip to the bottom of said pressure plate channel.

15. Photographic apparatus for use with a film cassette having a cassette housing configured for retaining a strip of photographic film material, an opening in an edge wall of such cassette housing configured to present a length of such film strip for cooperation with said apparatus for providing a photographic program with an incremental section of such presented length, and a pressure plate member located in such cassette housing behind such presented length and configured for supporting at least a portion of one side thereof, said apparatus comprising an apparatus housing, an aperture plate, means for receiving such film cassette in an operative location in said apparatus housing when such cassette is inserted in said receiving means such that such presented length of such film strip is translated laterally across said aperture plate and to a seated position thereon, said apparatus including means for cooperating with such incremental section of such film strip so as to provide such photographic program therewith when such incremental section is located in a predetermined focal position on said aperture plate, said aperture plate including a longitudinal aperture plate channel laterally bounded by spaced apart film margin engaging surfaces configured for supporting the margins of such film strip when such film strip is operatively located on said aperture plate and a ramp-like portion extending substantially from the bottom of said aperture plate channel to one of said film margin engaging surfaces so as to urge such presented length of such film strip out of said aperture plate channel and to said one margin engaging surface when such film strip is translated laterally across said aperture plate towards said one margin engaging surface during the operative location of such cassette within said receiving means.

16. A photographic system for use with a strip of photographic film for providing a photographic operation with progressive incremental sections of the photographic film strip, the film strip including on one side thereof an emulsion layer configured for providing recorded images in a usable portion intermediate the film margins, said system comprising a pressure plate configured for supporting the margins of a predetermined length of the one side of the film strip, said pressure plate including an elongated channel substantially aligned with the longitudinal axis of the predetermined length of the film strip, said channel being laterally bounded by a pair of laterally spaced, longitudinally extended members, each member respectively having a film margin engaging surface configured for providing contact solely with the margins of the one side of the film strip, and means configured for cooperating with said pressure plate so as to urge the portion intermediate the margins of the predetermined length of the film strip towards said pressure plate and partially into said channel to longitudinally bow the predetermined length of the film strip into a precise curved focal location without contact to the usable portion of the emulsion layer, said cooperating means including an elongated aperture plate having an aperture therein configured for passing light rays to or from an incremental section of the predetermined length of the film strip, said aperture plate including means for defining a substantially flat film margin reference plane configured to engage at least the margins of the film strip and at least one pad located along the longitudinal axis of said aperture plate and extending out of said reference plane towards said pressure plate so as to engage and urge the intermediate portion of the presented length of the film strip slightly above said reference plane and into said pressure plate channel, and means for spacing the pressure plate and aperture plate such that said margin engaging surfaces of said pressure plate members are spaced from said aperture plate reference plane a distance slightly exceeding the thickness of the film strip margins so as to define a gap therebetween the loosely confining the film margins while preventing extension of the bow of the film to the bottom of said pressure plate channel.

17. The apparatus of claim 15 wherein said aperture plate includes an elongated base plate having on one surface thereof a pair of raised members whose uppermost surfaces are substantially coplanar and define said film margin reference plane, said raised members extending along said base plate substantially parallel to the longitudinal axis thereof and defining a longitudinal channel therein whose bottom surface is defined by said one surface of said base plate, said raised members being laterally spaced apart a distance substantially approximately equal to or slightly greater than the width of the usable intermediate portion of the film strip, at least one spacer member extending from said one surface to a height exceeding that of said raised members and configured to contact said pressure plate and define said gap for the film margins, said spacer member being spaced laterally of the longitudinal axis of said base plate and to one side of said aperture plate channel and one of said raised members, an aperture located between said raised members, and a pair of pads of relatively short longitudinal length located between said raised members in said channel, each of said pads extending from said one surface of said base plate to a height exceeding that of said raised members so as to engage the intermediate portion of the film strip and urge the intermediate portion into the pressure plate channel.

18. Photographic apparatus for use with a film handling cassette having a housing configured for retaining a strip of photographic film, such cassette housing including an elongated opening in an edge wall thereof configured to present a length of such film for exposure operations, an elongated pressure plate of given lateral width, such lateral width being defined by first and second spaced apart edges of such pressure plate, such pressure plate being located in said cassette housing behind and in substantially longitudinal alignment with such presented length of such film strip so as to support at least a portion of such presented length of such film strip for cooperation with said apparatus, such cassette housing including a pair of opposed side walls whose inner surfaces define the laterally spaced edges of such elongated opening, such pressure plate being loosely mounted between such side walls and configured for location of such first edge of such pressure plate against the inner surface of one of such cassette side walls responsive to external means, said apparatus comprising:
 an apparatus housing;
 means for receiving such film cassette in an operative location in said apparatus housing, and an elongated aperture plate located in operative relation to said receiving means, said aperture plate including means for engaging such film strip and for cooperating with such pressure plate, when such film cassette is in its operative location in said apparatus housing, to position such film in a predetermined position, and said aperture plate including first means for engaging such inner surface of such one cassette side wall and second means, laterally spaced from said first means, for positively engaging such pressure plate, and said receiving means including means for urging such inner surface of such one side wall into engagement with said first means such that such pressure plate is held between such inner surface of such one side wall and said second means thereby fixedly locating such pressure plate over said aperture plate.

19. The apparatus of claim 18 wherein said second means for engaging engages such second edge of such pressure plane, said first and second means being laterally spaced apart a distance equal to such lateral width of such pressure plate.

20. The apparatus of claim 18 wherein said means for urging such inner surface of such one side wall comprises spring means attached to said receiving means and reacting against the outer surface of such one side wall.

21. The apparatus of claim 19 wherein said first means for engaging such inner surface of such one cassette side wall comprises a surface integrally formed with said aperture plate and said second means for engaging such second edge of such pressure plate also comprises a structural portion of said aperture plate.

22. The apparatus of claim 21 wherein said structural portion of said aperture plate comprising said second means for engaging further comprises at least one upstanding projection from said aperture plate which positively engages such second edge of such pressure plate.

* * * * *